Figure 1:
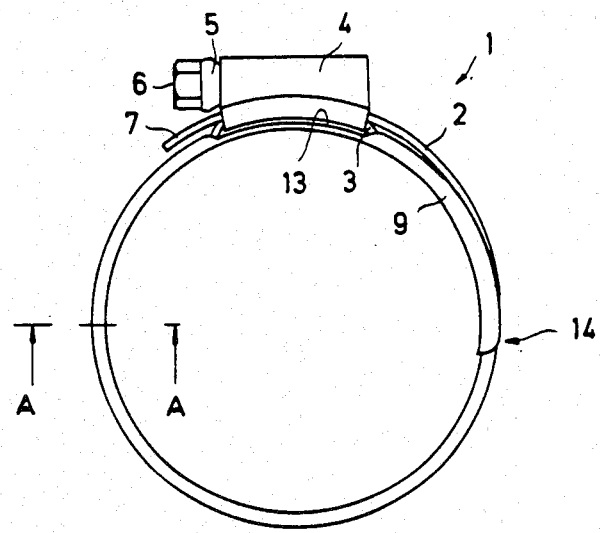

United States Patent [19]

Enlund

[11] Patent Number: 4,667,375
[45] Date of Patent: May 26, 1987

[54] HOSE CLIP

[75] Inventor: Birger S. I. Enlund, Södertälje, Sweden

[73] Assignee: ABA Invest AB, Stockholm, Sweden

[21] Appl. No.: 775,059

[22] PCT Filed: Dec. 21, 1984

[86] PCT No.: PCT/SE84/00442

§ 371 Date: Aug. 21, 1985

§ 102(e) Date: Aug. 21, 1985

[87] PCT Pub. No.: WO85/02894

PCT Pub. Date: Jul. 4, 1985

[30] Foreign Application Priority Data

Dec. 23, 1983 [SE] Sweden ................. 8307152

[51] Int. Cl.[4] .................................. B65D 63/02
[52] U.S. Cl. .................................. 24/274 R; 24/279
[58] Field of Search ......... 24/274 R, 274 P, 274 WB, 24/279, 269, 284, 282, 20 S, 21, 25, 20 TT, 20 CW; 285/253

[56]  References Cited

U.S. PATENT DOCUMENTS

| 1,146,813 | 7/1915 | Peterman et al. ................ 4/279 |
| 1,635,783 | 7/1927 | Goodall . | |
| 1,830,558 | 11/1931 | Olson ................ 24/279 |
| 1,904,578 | 4/1933 | Vanderhoof ................ 24/279 |
| 2,395,745 | 2/1946 | King ................ 24/279 |
| 2,571,659 | 10/1951 | Bergstrom ................ 24/274 R |
| 2,910,758 | 11/1959 | Arthur ................ 24/274 R |
| 2,943,876 | 7/1960 | Morris ................ 24/274 R |
| 3,010,172 | 11/1961 | Kaplan ................ 24/279 |
| 3,315,991 | 4/1967 | Davis ................ 24/279 |
| 3,537,147 | 11/1970 | Pfeuffer ................ 24/20 TT |
| 4,308,648 | 1/1982 | Fay ................ 24/274 R |

FOREIGN PATENT DOCUMENTS

| 1256013 | 12/1967 | Fed. Rep. of Germany . |
| 63666 | 12/1941 | Norway . |
| 68929 | 6/1927 | Sweden . |
| 7812588-7 | 12/1978 | Sweden . |
| 7909746-5 | 10/1980 | Sweden . |
| 405027 | 7/1966 | Switzerland . |
| 1559 | of 1915 | United Kingdom . |
| 567031 | 1/1945 | United Kingdom ........ 24/274 R |

Primary Examiner—Victor N. Sakran
Attorney, Agent, or Firm—Cushman, Darby & Cushman

[57] ABSTRACT

A hose clip includes an annularly formed outer tension band of substantially stiff material having ends which are connected to a tensioning device for regulating the girth of the clip, and also include an inner band of a spring material mounted inside the tension band, the inner band being formed with at least two inwardly directed beads, which are spring-biased radially and which are ridge-like and extend substantially annularly along the inside of the tension band whereby, on tightening about an elastic hose, the hose clip axially compresses the hose between the beads simultaneously as the beads compress the hose radially.

6 Claims, 2 Drawing Figures

HOSE CLIP

The present invention relates to a hose clip including at least one annularly formed tension band, the ends of which are connected to a tensioning device for regulating the girth of the hose clip conventionally.

Hose clips are commonly used within many branches of technology for removably connecting an elastic hose or the like to some form of pipe end. In such connections it is usual to tighten the hose clip with as large a force as possible with the object of achieving a tight and secure connection. This results in that radially inwards of the hose clip, the hose material is compressed and also pressed axially sideways. As a result, and with regard to the aging properties of the hose material, this causes the connection to have poor elasticity. In turn, this leads to the hose material not beeing able to compensate for changes caused by temperature variations in the connection. A consequence of deteriorated elasticity is that the hose material is given permanent deformation and that the tightness of the connection is adventured. Sooner or later there will be leakage problems, which are most clearly observed when the connection is subjected to severe cooling.

A usual method of solving leakage problems is to tighten the hose clip further. This is a very short-sighted solution however. The hose material is namely subjected to further compression which further deterioates its elasticity and thereby its ability to accompany temperature changes.

Devices which automatically re-tighten a hose clip are already known. Such devices may comprise a spring means which tangentially acts on a worm screw that tightens a hose clip so that the clip is re-tightened. Such a solution is illustrated in the Swedish Patent Application No. 7812588-7. However, the same disadvantages occur in this type of hose clip as occur when manually re-tightening a hose clip, and this automatically re-tightening hose clip therefore does not have any great application in practice.

Another variation of a hose clip with automatic re-tightening is described in the Swedish Pat. No. 415920. This hose clip includes a conventional hose clip supplemented by a spring-biassed insert having a tubular cross section. The insert is intended to engage with spring bias against a host and compensate for the deformations taking place in the hose material. Neither does this implementation prevent deformation of the hose material on tightening, which reduces the elasticity of the hose. As with the previously mentioned implementations, the hose material will namely be subjected to radial compression simultaneously as it is pressed axially sideways.

The present invention has the object of better enabling a tight and secure hose connection than implementations known up to now. In contradistinction to known implementations, the invention has the object of primarily avoiding the situation where the hose material loses its elasticity, although the invention also has the object that an inventive hose clip will compensate for the hose material losing its elasticity, should this condition occur.

Further to this, the invention shall enable connections which are simple to fit and which are applicable for many different types of hose connection. In accordance with the invention, the mentioned objects are achieved by the hose clip being formed with at least two inwardly directed ridge-like beads, or the like, extending substantially annularly along the inside of the band.

By the inventive hose clip compressing a part of the hose material between the ridge-like beads when being tightened round an elastic hose, there is avoided outflow of material at the sides of the clip, which is a normally present disadvantage in known embodiments of hose clips. The radial pressure from the clip between the beads is comparatively small, and the hose material there is thus only subjected to minor compression. This results in that the hose material there can maintain its elasticity longer than in known embodiments.

By forming the beads with radial spring bias there is obtained an automatic re-tightening of the hose clip, which compensates for possible deformations of the hose material radially inwards of the beads. In such a deformation, the invention permits the elastic hose material between the beads to be pressed axially outwards towards the beads, when necessary, for compensating the deformation of the hose material.

Since the beads are spring-biassed there is also avoided that the hose clip is tightened too much when it is fitted.

Other distinguishing properties of the invention are apparent from the appended description of an example of an advantageous embodiment of the invention.

Figure 2:
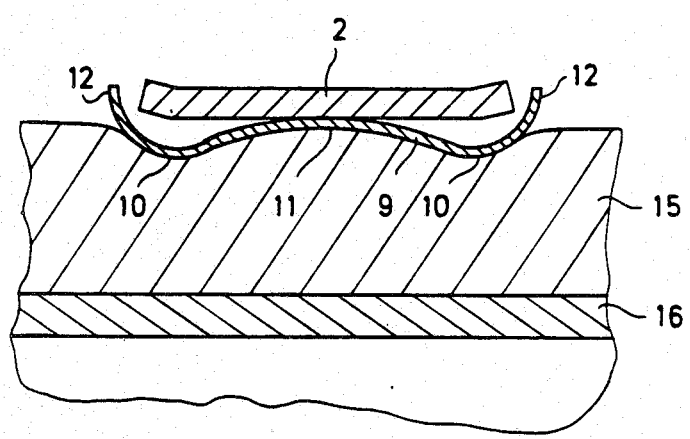

The description is carried out with reference to the accompanying drawing, on which FIG. 1 is an axial view of an inventive hose clip, and FIG. 2 is a cross section of the hose clip along the line A—A in FIG. 1, and to an enlarged scale.

The exemplified hose clip 1 comprises a substantially flat tension band 2 which is formed into a ring. At one end 3 of the band 2 there is attached a screw housing 4, accommodating a rotatably mounted worm screw 5. The screw 5 is formed with a head 6 exterior to the housing 4, the head 6 being formed with a slot and/or a hexagonal shape to enable turning the screw 5. The screw 5 is conventionally arranged to mesh with means serving as a thread at the other end 7 of the band 2. Rotation of the screw 5 conventionally results in an alteration in the diameter of the clip 1.

An inner tension band 9 is removably mounted radially inside the tension band 2 of the hose clip 1. The tension band 9 is formed form a flexing or springing material, e.g. a uniformly thick metal strip, and by bending it has been given an annular shape which can be mated with the inside of the outer tension band 2.

The inner tension band 9 is inventively formed with two substantially annular beads 10 with axial positions within the width of the band 2. The cross section A—A in FIG. 2 illustrates the beads 10 separated by an arcuate bulge 11 on the band 9 in the central area of the hose clip 1, this convex form being adapted to engage against the inside of the outer tension band 2.

The inner tension band 9 extends axially on either side of the outer tension band 2 and is formed with substantially radially outwardly directed edges 12 which embrace the outer tension band 2. These edges 12 position the inner tension band 9 axially relative the outer band 2. The edges 12 are however formed with a recess 13 to allow for the screw housing 4 when fitted. The ends of the inner tension band 9 overlap each other in a position 14, which is preferably not the same as the position for the screw housing 4.

The hose clip 1 with the separate inner tension band 9 may be included in a hose connection in which a hose 15 of elastic material is clamped to a pipe stub 16. The connection is tightened conventionally by rotating the worm screw 5. The outer band 2 as well as the inner tension band 9 inside it are thus stressed. The beads 10 on the inner band 9 then engage against the hose 15 so that a seal is made against the pipe stub 16. A portion of the hose material is simultaneouslly pressed by the beads 10 axially inward towards the central zone of the hose clip 1. Here the tension bands 2,9 do not exert any great compression on the hose material, and the beads 10 engage with radial spring bias in the hose 15. As a result of this the hose clip 1 is prevented from being tightened too heavily on being fitted, as well as the implementation allowing an automatic re-tightening of the hose clip 1.

Within the scope of the following claims the invention may be modified and implemented differently from what has been exemplified above. In the example of the description the hose clip 1 includes a conventional hose clip supplemented by a spring-biassed inner tension band 9. However, the hose clip 1 may also be formed with a single band, which is then formed from spring material and with beads 10. It is also conceivable to utilize a conventional hose clip supplemented with an insert comprising a stiff inner tension band formed with beads 10, and then the inner band should be separated from the band of the conventional hose clip by a resilient insert.

A conventional hose clip has been intended in the exemplified description, where tightening it has been achieved with the aid of a worm screw 5. Other types of conventional hose clip supplemented with inventive insertes are also conceivable in alternative embodiments of the invention.

I claim:

1. A hose clip comprising an annularly formed outer tension band having ends which are of substantially stiff material, connected to a tensioning device for regulating the girth of the clip, and an inner band of a spring material mounted inside the outer tension band, the inner band being formed with at least two axially-spaced inwardly directed beads having concave cross sections, which beads are spring-biased radially and which beads are ridge-like and extend substantially annularly along the inside of the inner band, the inner band also having an axial, convex central zone between said beads, said central zone engaging against a straight inner portion of the tension band whereby, on tightening about an elastic hose, the hose clip axially compresses the hose between the beads simultaneously as the beads compress the hose radially.

2. A hose clip as in claim 1 wherein the inner band, which forms an insert, extends axially outside the outer tension band on either side thereof, said inner band being formed with radially outwardly directed edges for axially positioning the bands relative to each other.

3. A hose clip as in claim 1 wherein the thickness of the inner band is less than that of the outer tension band.

4. A hose clip as in claim 1 wherein the ends of the inner band overlap.

5. A hose clip as in claim 4 wherein the tensioning device of the outer band comprises a worm screw accommodated in a screw housig and wherein the ends of the inner band overlap at the position separate from that of the screw housing.

6. A hose clip comprising an outer tension band having opposite ends; an adjustable tensioning device cooperating with said opposite ends for regulating the girth of said outer band; an inner band in the form of a spring metal strip mounted inside said outer band, said inner band having at least two radially inwardly directed beads which are axially spaced apart and extend annularly along the inside of the inner band said inner band also including a convex bulge protruding radially outward between said beads into contact with the inside of said outer band, said inner band extending axially on either side of said outer band and having radially outwardly directed edges which embrace said outer band, the construction being such that upon tightening of the clip about an elastic hose by tightening of said outer band by manipulation of said tensioning device, said bands will compress the hose radially and simultaneously compress the hose axially between said beads.

* * * * *